United States Patent

Ishigaki

[11] Patent Number: 6,121,921
[45] Date of Patent: Sep. 19, 2000

[54] POSITION DETECTION APPARATUS

[75] Inventor: Toshihiro Ishigaki, Kawasaki, Japan

[73] Assignee: Matsushita Electric Industrial Co., Ltd., Osaka, Japan

[21] Appl. No.: 08/887,086

[22] Filed: Jul. 2, 1997

[30] Foreign Application Priority Data

Jul. 9, 1996 [JP] Japan ..................................... 8-196973

[51] Int. Cl.$^7$ ....................................................... G01S 5/02
[52] U.S. Cl. ............................................................ 342/357
[58] Field of Search ............................. 342/357; 701/213

[56] References Cited

U.S. PATENT DOCUMENTS

| 5,101,416 | 3/1992 | Fenton et al. | 342/357 |
| 5,491,486 | 2/1996 | Welles, II et al. | 342/357 |
| 5,592,173 | 1/1997 | Lau et al. | 342/357 |
| 5,650,785 | 7/1997 | Rodal | 342/357 |
| 5,703,598 | 12/1997 | Emmons | 342/357 |

FOREIGN PATENT DOCUMENTS 420889  1/1992  Japan .

Primary Examiner—Gregory C. Issing
Attorney, Agent, or Firm—Pollock, Vande Sande & Amernick

[57] ABSTRACT

A position detection apparatus is disclosed which comprises: a GPS receiver for receiving at least a GPS radio wave signal, calculating and outputting position data from at least the GPS signal received; a PWR SUPP for supplying a PWR to the GPS receiver; a SW for controlling supplying the PWR to the GPS receiver; a timer; and a control portion for operating the SW to supply the PWR to the GPS receiver periodically using the timer and the SW, for detecting whether the position data Is outputted by the GPS receiver for a predetermined interval from when the PWR is supplied using the timer, and for operating the SW to stop supplying the PWR to the GPS receiver when the position data is not outputted by the GPS receiver for the predetermined interval. The control portion stores the position data from the GPS receiver and reads and outputs the latest position data in response to a position data request. Scanning a PRN signal in the GPS signal with a PRN signal generated therein with a range determined by a total continuous PWR OFF period. In the cyclic PWR ON operation, the cycle is controlled by an externally input signal. An intermittent receiving operation may be effected when the position data is not outputted by the GPS receiver because more than a predetermined number of GPS signals are not received.

7 Claims, 7 Drawing Sheets

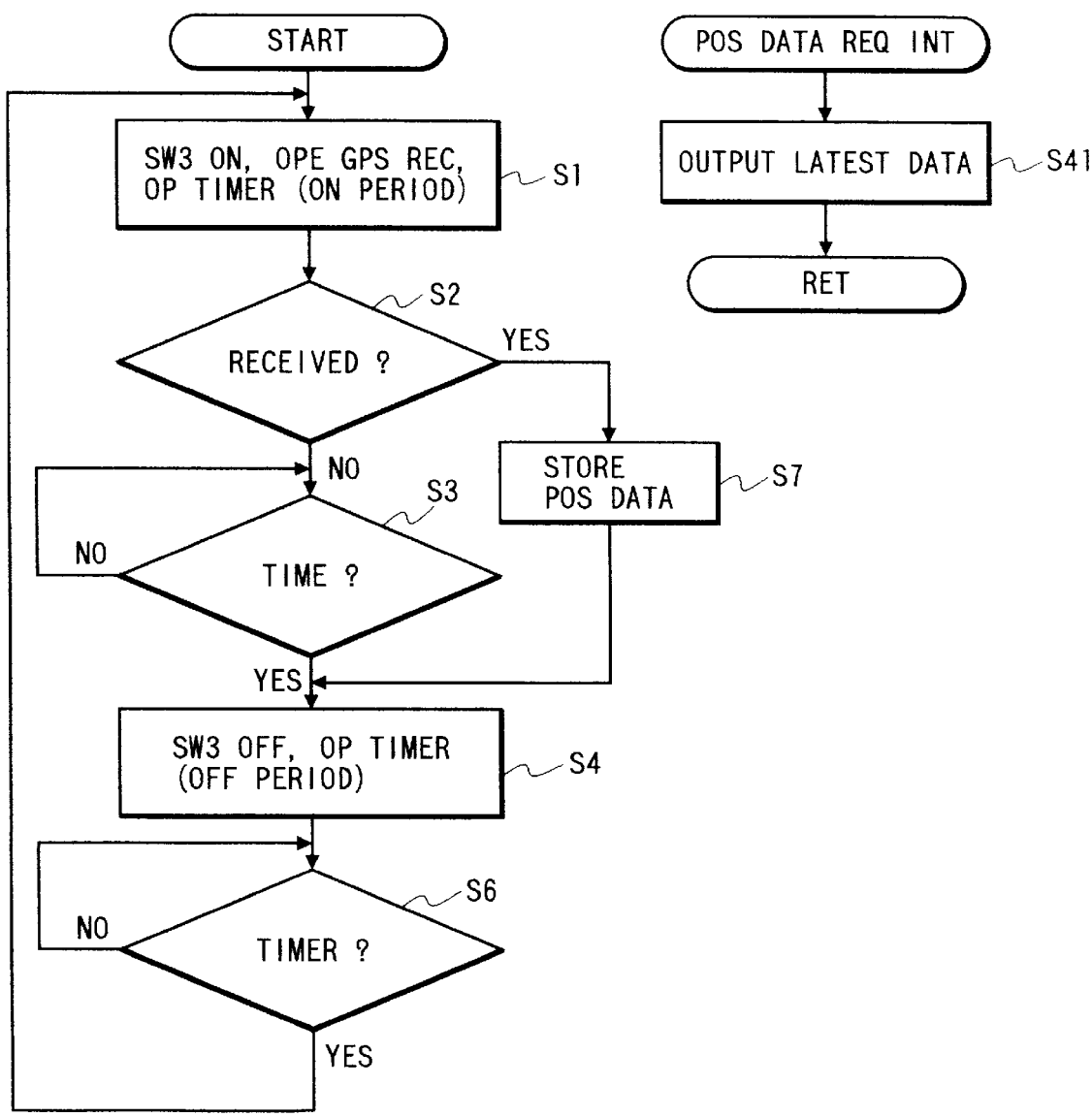

POSITION DETECTION APPARATUS

BACKGROUND OF THE INVENTION

1. Field of the Invention

This invention relates to a position detection apparatus for detecting a position thereof using data from a navigation satellite system.

2. Description of the Prior Art

A position detection apparatus for detecting a position thereof using data from a navigation satellite system is known. Such a position detection apparatus comprises a GPS receiver for receiving GPS radio wave signals, each including navigation data spectrum-spread-modulated, and a position calculating portion for calculating and outputting data of its position from orbit data and time data included in the received navigation data, etc. Such a prior art GPS receiver is disclosed in U.S. Pat. No. 5,101,416. The GPS signal is demodulated by PRN code. The PRN code is scanned by successively changing a phase of PRN code generated in the GPS receiver to compare the phase of the PRN code thereof with that in the GPS signal. Such a GPS receiver is disclosed in Japanese patent application provisional publication No. 4-20889.

SUMMARY OF THE INVENTION

The aim of the present invention is to provide an improved position detection apparatus.

According to the present invention, a first position detection apparatus is provided, which comprises: a GPS receiver, including an antenna, for receiving at least a GPS radio wave signal, calculating and outputting position data from at least the GPS signal received; a power supply for supplying a power to the GPS receiver; a switch for controlling supplying the power to the GPS receiver; a timer; and a control portion for operating the switch to supply the power to the GPS receiver periodically using the timer and the switch, for detecting whether the position data is outputted by the GPS receiver for a predetermined interval from when the power is supplied using the timer, and for operating the switch to stop supplying the power to the GPS receiver when the position data is not outputted by the GPS receiver for the predetermined interval at the latest.

In the first position detection apparatus, the control portion may stop supplying the power immediately when the position data is outputted by the GPS receiver.

In the first position detection apparatus, the control portion may comprise a memory for storing the position data from the GPS receiver and the control portion reads and output the latest position data from the memory in response to a position data requesting signal.

In the first position detection apparatus, the GPS signal includes a first PRN (pseudorandom noise) code and the control portion generates a storing command just before the control portion stops supplying the power, calculates a total period while the power is continuously not supplied to the GPS receiver, and supplies data of the total period to the GPS receiver when the control portion supplies the power to the GPS receiver, and wherein the GPS receiver comprises: a PRN code generator for generating a second PRN code with a phase of the second PRN code controlled in accordance with phase control data; a storing portion for storing the phase control data in response to the storing command; a range data generation portion for generating scanning range data in accordance with the data of the total period; a correlation detection portion for detecting a correlation between the first and second PRN codes; and a phase control portion for generating and supplying the phase control data to the PRN code generator and the storing portion in accordance with a correlation result from the correlation detection portion and for scanning the first PRN code with the second PRN code with the phase control data successively changed in accordance with the correlation result from the correlation detection portion with a range determined by the scanning range data and the stored phase data when the power is supplied to the GPS receiver.

In the first position detection apparatus, the control portion may further comprise a receiving portion for receiving an ON period data and operates the switch to supply power to the GPS receiver at a cycle determined in accordance with the ON period data using the timer.

According to the present invention, a second position detection apparatus is provided which comprises: a GPS receiver for receiving a plurality of GPS signals and for calculating and outputting position data from the received plurality of GPS signals when more than a predetermined number of GPS signals are received; a power supply for supplying a power to the GPS receiver; a switch for controlling supplying the power to the GPS receiver; a timer; and a control portion for operating the switch to supply the power to the GPS receiver using the switch, for detecting whether the position data is outputted by the GPS receiver for a predetermined interval from when the power is supplied using the timer, and for effecting an intermittent receiving operation using the timer and the switch when the position data is not outputted by the GPS receiver for the predetermined interval until the GPS receiver outputs the position data.

BRIEF DESCRIPTION OF THE DRAWINGS

The object and features of the present invention will become more readily apparent from the following detailed description taken in conjunction with the accompanying drawings in which:

FIG. 3 depicts a flow chart of the first embodiment showing the operation of the first position detection apparatus;

FIG. 4 depicts a flow chart of the first embodiment showing an interruption operation;

The same or corresponding elements or parts are designated with like references throughout the drawings.

DETAILED DESCRIPTION OF THE INVENTION

Figure 1:
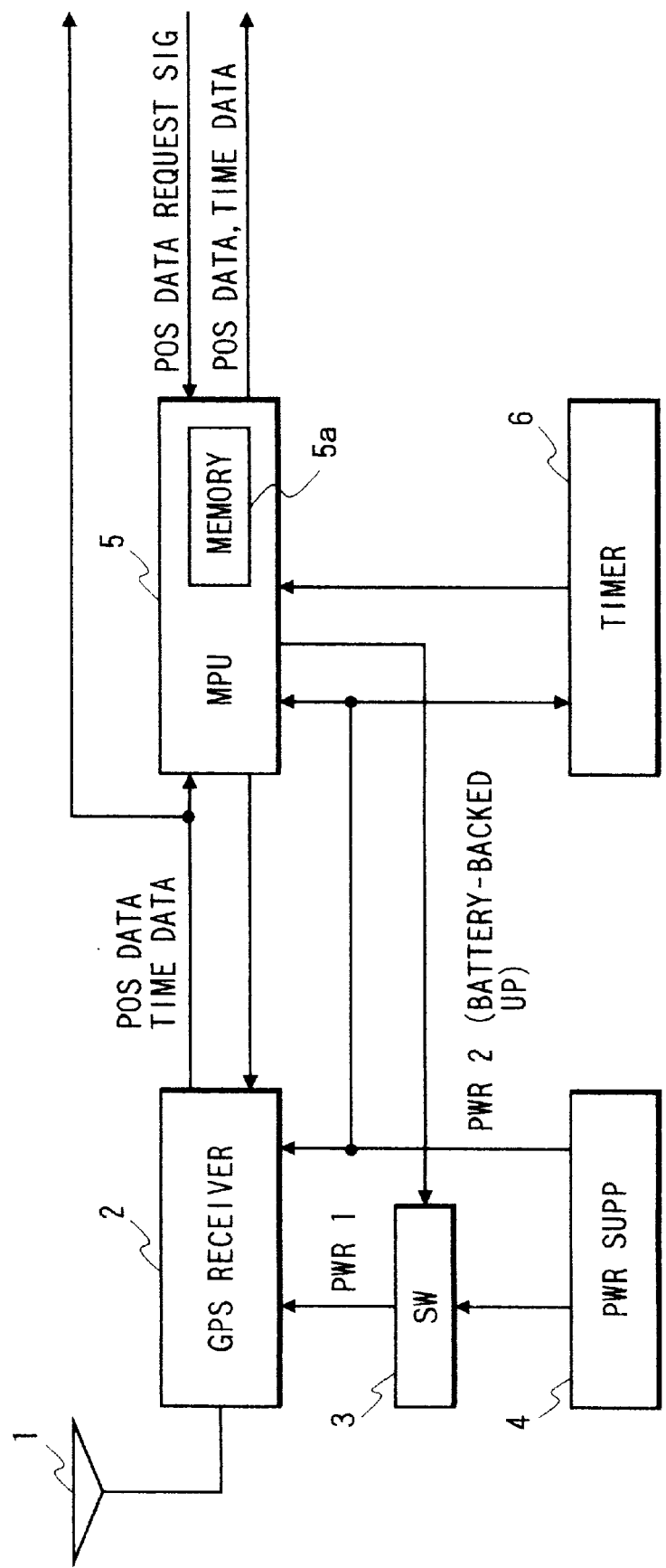
FIG. 1 is a block diagram of a position detection apparatus of a first embodiment and a modification.
Figure 2:
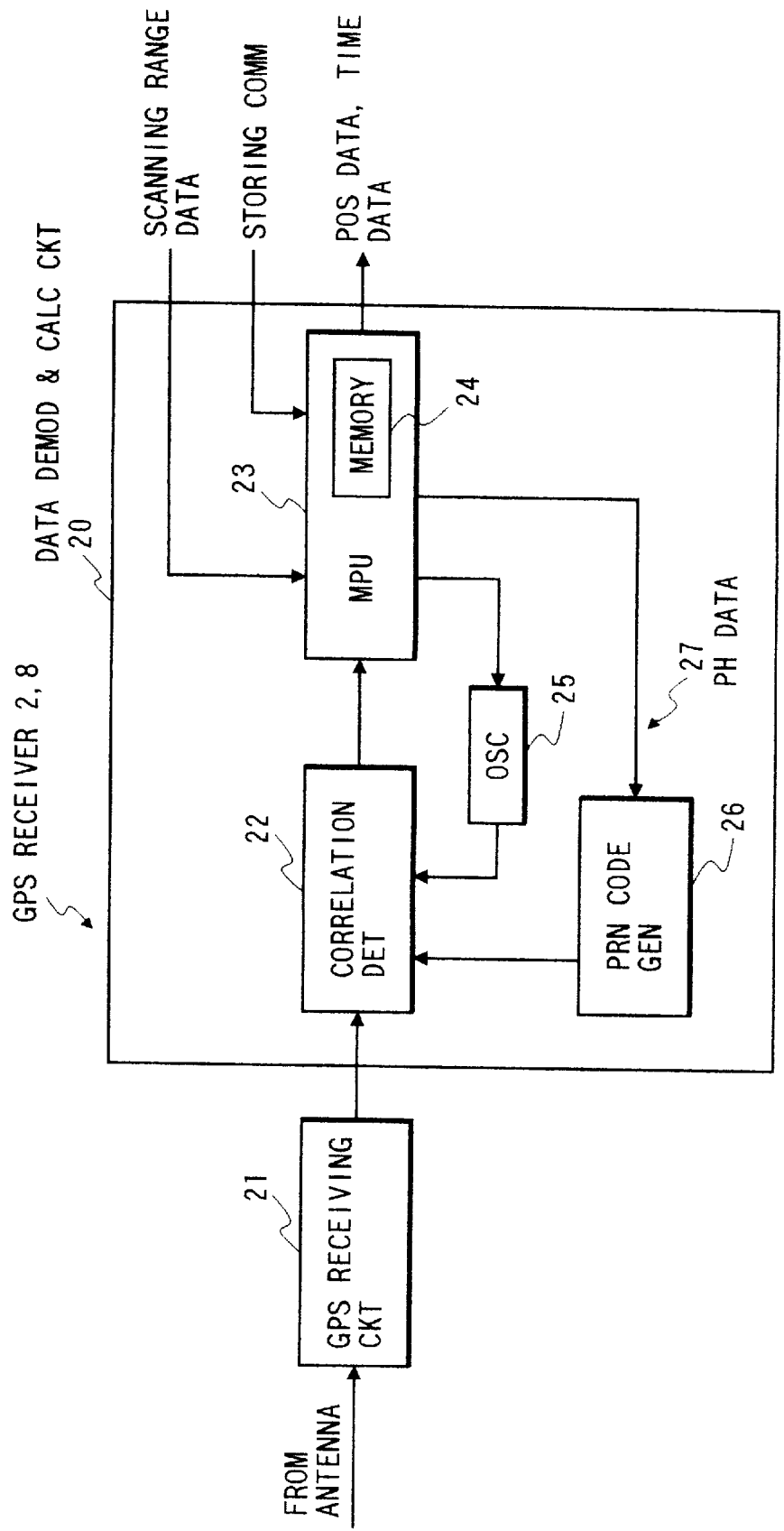
FIG. 2 is a partial block diagram of GPS receiver of the first embodiment and a second embodiment.

A first embodiment will be described. FIG. 1 is a block diagram of a position detection apparatus of the first embodiment. FIG. 2 is a partial block diagram of GPS receiver shown in FIG. 1, which will be referred again in a second embodiment.

The position detection apparatus of the first embodiment comprises a GPS receiver 2 including an antenna 1, for receiving a plurality of GPS signals, and for calculating and outputting position data from the plurality of GPS signal received, a power supply 4 for supplying powers for GPS receiver 2 and other circuits, a switch 3 for controlling supplying the power to the GPS receiver 2 as a power PWR1, a timer 6 for measuring time in accordance with time period setting data and a start command; and a microprocessor (MPU) 5 as a control circuit for operating the switch 3 to supply the power PWR1 to the GPS receiver periodically using the timer 6 and the switch 3 and operating the GPS receiver 2, for detecting whether the position data is outputted by the GPS receiver for a predetermined interval from when the power PWR1 is supplied using the timer 6, and for operating the switch 3 to stop supplying the power PWR1 to the GPS receiver 2 when the position data is not outputted by the GPS receiver 2 for the predetermined interval at the latest.

The GPS receiver 2 comprises a GPS receiving circuit 21 for providing I and Q signals and a data demodulation and calculation circuit 20 for demodulating the I and Q signals from the GPS receiving circuit 21 and effecting calculations to provide the position data and the time data.

An operation will be described.

In order to accurately determined the position of the position detection apparatus, GPS signals from more than three GPS satellites should be received. The GPS signal is generated by modulating a carrier of 1.5 GHz by navigation data and a PRN code identically assigned to every GPS satellite. The GPS receiver 2 catches target GPS signals using PRN codes in a memory therein which corresponds to the PRN codes of the PRN codes of the target GPS signal. Synchronizing is performed by obtaining a correlation between the received PRN code and the PRN code generated therein with a phase successively varied (scanning). From the detected navigation data including orbit data and time data, the GPS receiver calculates the position thereof.

The operation will be described more specifically.

The GPS receiver 2 receives a plurality of radio wave GPS signals through the antenna 1. Generally, it is necessary to receive navigation data including orbit data and time data from more than three GPS satellites to accurately determine the position of the GPS receiver. The GPS receiver 2 determines the position thereof from the orbit data, the timed data, and phase relations between the PRN (pseudorandom noise) codes generated in accordance with the target GPS satellite and the PRN code generated therein.

The GPS receiver 2 calculates and outputs position data determined as mentioned. The power supply 4 generates and supplies power for the GPS receiver 2 and other circuits. The switch 3 supplies the power PWR1 to the GPS receiver 2 under control of the microprocessor 5. The timer 6 measures time in accordance with time period setting data and a start command from the microprocessor 5. The microprocessor 5 operates the switch 3 to supply the power PWR1 to the GPS receiver periodically using the timer 6 and the switch 3. The microprocessor 5 further detects whether the position data is outputted by the GPS receiver 2 for the predetermined interval from when the power PWR1 is supplied using the timer 6. The position data and time data may not be outputted because more than a predetermined number of GPS signals may not be received. If the position data is outputted by the GPS receiver 2 for the predetermined interval, the microprocessor 5 operates the switch 3 to stop supplying the power PWR1 to the GPS receiver 2 to save power consumption but the power PWR1 is supplied periodically to obtain the position data which may be obtained by the GPS receiver 2 when the position detection apparatus moves to a place where a receiving condition is good.

FIG. 3 depicts a flow chart of the first embodiment showing the operation of the first position detection apparatus.

The microprocessor 5 turns on the switch 3, operates the GPS receiver 2, and sets and starts the timer 6 with on-period data in step s1. If the microprocessor 5 receives the position data and time data within the predetermined interval defined by the on-period data in step s2, the microprocessor 5 stores the position data in step s7. Then, the microprocessor 5 turns off the switch 3 immediately to save power and operate the timer 6 with off-period data in step s4. On the other hand, if the microprocessor 5 does not receive the position data and time data within the predetermined interval in steps s2 and s3, the microprocessor 5 directly proceeds to step s4 via step s3. Then, the microprocessor 5 determines whether the off-period has passed in step s6. If the off-period has passed in step s6, processing returns to step s1. Then, an intermittent receiving operation to save the power in an insufficient receiving condition is provided.

FIG. 4 depicts a flow chart of the first embodiment showing an interruption operation. When the microprocessor 5 receives a position data request signal through an interruption input thereof, the microprocessor 5 reads the latest position data and the latest time data in the memory 24 provided therein and outputs the latest position data and latest time data in step s41.

The microprocessor 5 is supplied with the power PWR2 which is battery-backed up, so that the position data and the timed data can be stored for the off period of the GPS receiver 2, so that the latest position data and the latest time data can be provided while the power PWR1 is not supplied or while the navigation data is not received from more than three GPS satellites.

Figure 5:
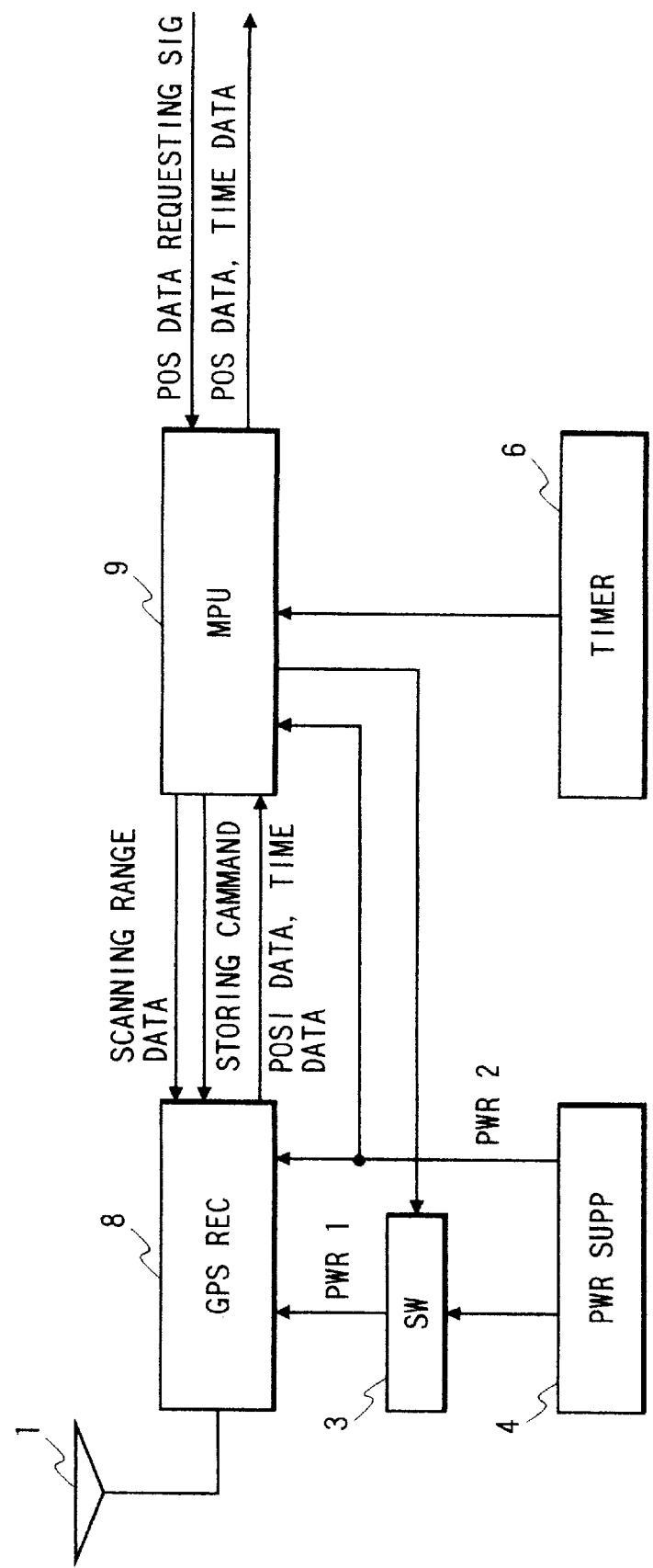
FIG. 5 is a block diagram of the position detection apparatus of a second embodiment.

A second embodiment will be described. FIG. 5 is a block diagram of the position detection apparatus of the second embodiment. FIG. 2 is also referred in the second embodiment.

The position detection apparatus of the second embodiment has substantially the same structure as that of the first embodiment. The difference is that the microprocessor 9 supplies a storing command and scanning range data to the GPS receiver 8 and the GPS receiver 8 stores phase data for the PRN code generator 26 in a memory 24 provided therein in response to the storing command just before the microprocessor 9 stops supplying the power to the GPS receiver 2 and the GPS receiver 8 scans the PRN signal in the GPS signal with the PRN signal generated therein using the phase data stored just before the power off and a scanning range data supplied from the microprocessor 9 when the power PWR1 is turned on.

Figure 6:
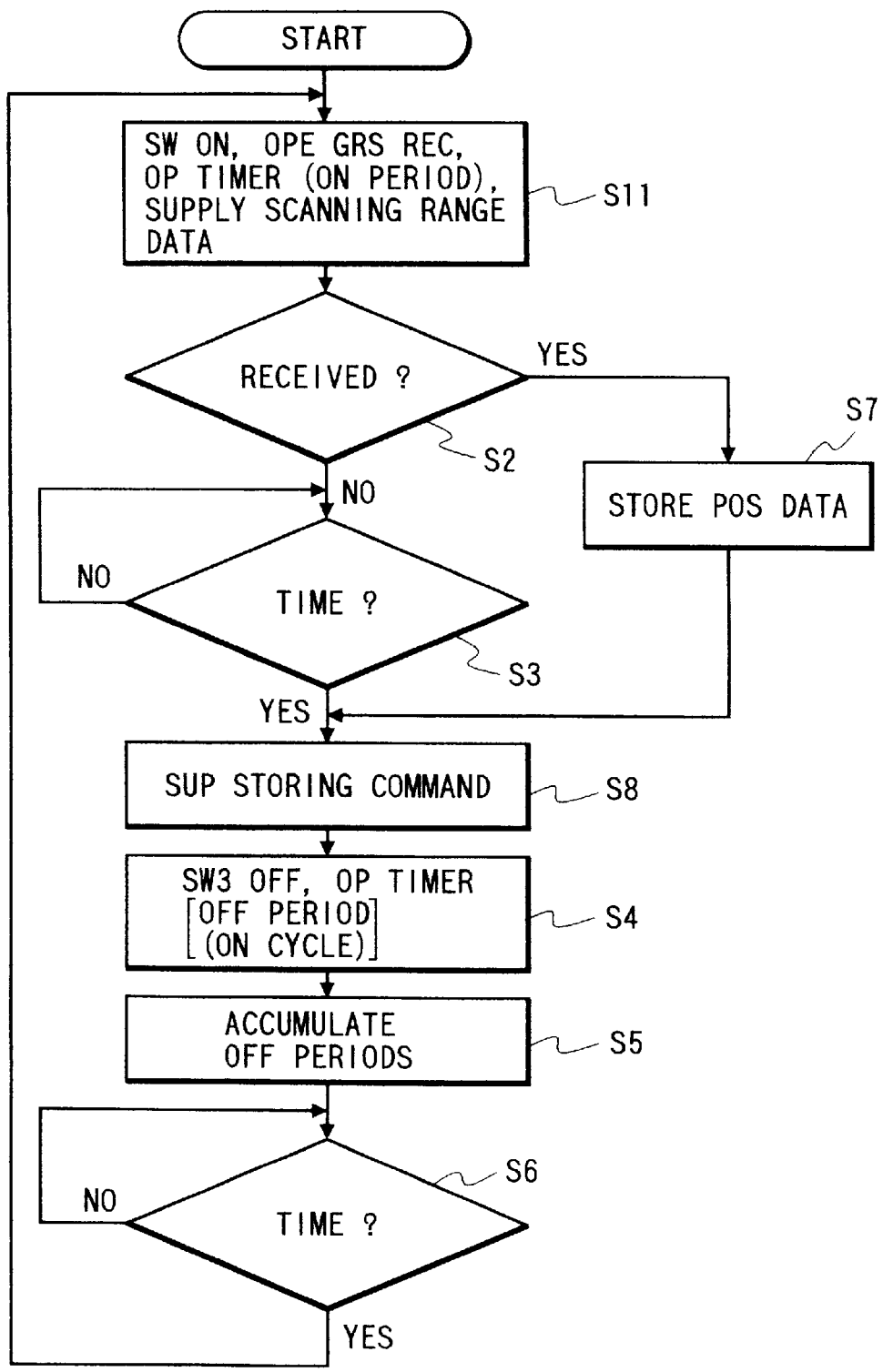
FIG. 6 depict a flow chart of the second embodiment and a third showing an operation of the microprocessor in FIG. 5.

FIG. 6 depict a flow chart of the second embodiment showing an operation of the microprocessor 9 in FIG. 5.

The microprocessor 9 turns on the switch 3, operates GPS receiver 8, and sets and starts the timer 6 with on-period data in step s11. If the microprocessor 9 receives the position data and time data within the predetermined interval defined by the on-period data in step s2, the microprocessor 9 stores the position data in step s7. Then, the microprocessor 9 generates and supplies the storing command to the GPS receiver 8 in step s8. A microprocessor 23 of the GPS receiver 8 stores the phase data of the GPS satellites currently used in the PRN code generator 26. On the other hand, if the microprocessor 9 does not receive the position data and time data within the predetermined interval in step s2, the microprocessor 9 directly proceeds to step s8 via step s3. In the following step s4, the microprocessor 9 turns off the switch 3 to save the power and operate the timer 6 with off-period data in step s4. Then, the microprocessor 9 accumulates off-periods to provide a total off period in step s5. In the following step s6, the microprocessor 9 determines whether the off-period has passed. If the off-period has passed in step s6, processing returns to step s11. In step s11, the microprocessor generates the scanning range data in accordance with the total off period. The microprocessor 23 receives the scanning range data from the microprocessor 9 and determines a phase variation range from the scanning range data and the stored phase data. That is, the phase of the PRN code is varied around the phase corresponding to the stored phase data with the scanning range indicated by the scanning range data. Therefore, the phase of the PRN code for the PRN code generator 26 is varied in accordance with the scanning range data and the stored phase data, so that an interval necessary to trace the PRN code in the GPS signal can be shortened.

Figure 7:
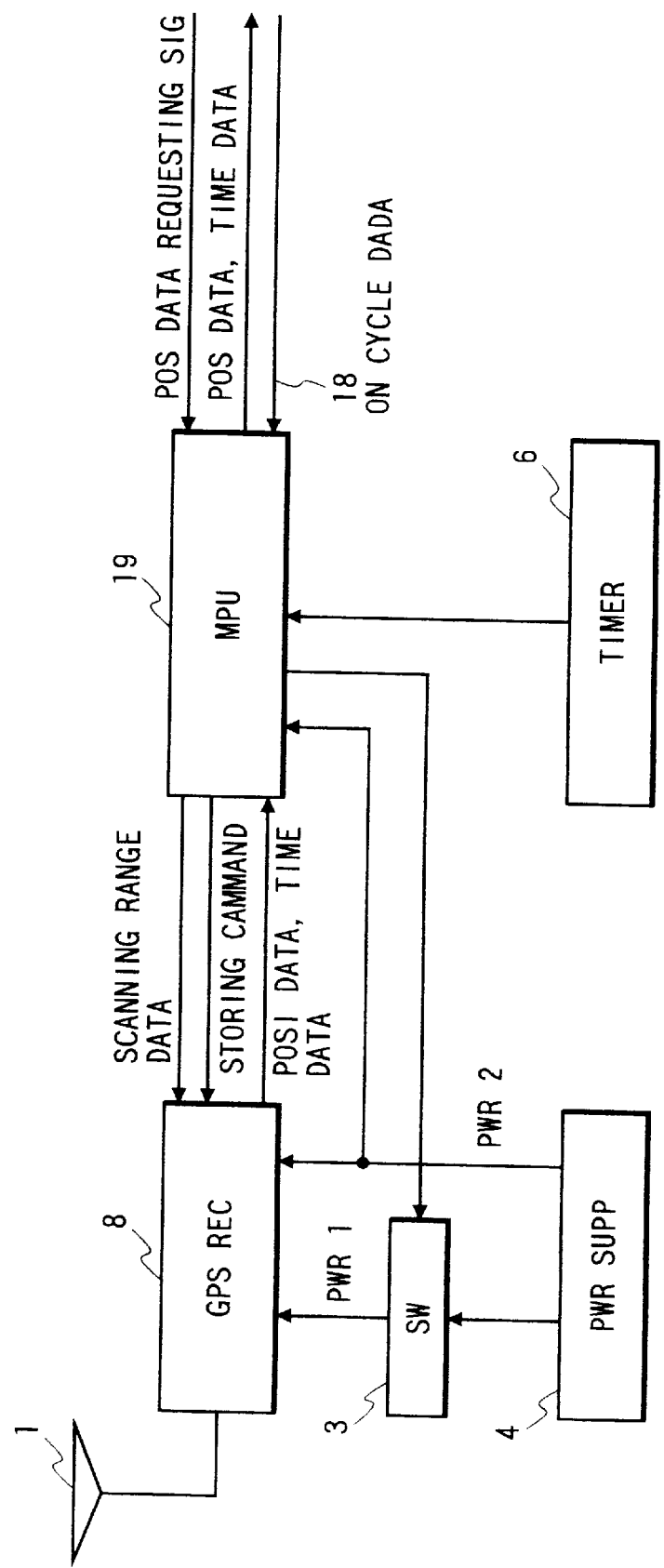
FIG. 7 is a block diagram of the position detection apparatus of a third embodiment.

A third embodiment will be described. FIG. 7 is a block diagram of the position detection apparatus of the third embodiment. FIG. 6 is also referred in this embodiment.

The position detection apparatus of the third embodiment has substantially the same structure as that of the second embodiment. The difference is that an on cycle of the GPS receiver 8 is controlled in accordance with on cycle data externally inputted.

The microprocessor 19 generates and supplies the off period data to the timer 6 in accordance with the on cycle data in step s4. Therefore, the on cycle of the GPS receiver 8 can be adjusted in accordance with the degree of immediately requiring the position data and the time data or in accordance with the receiving condition of the GPS signals, so that the power consumption is adaptively saved.

Figure 8:
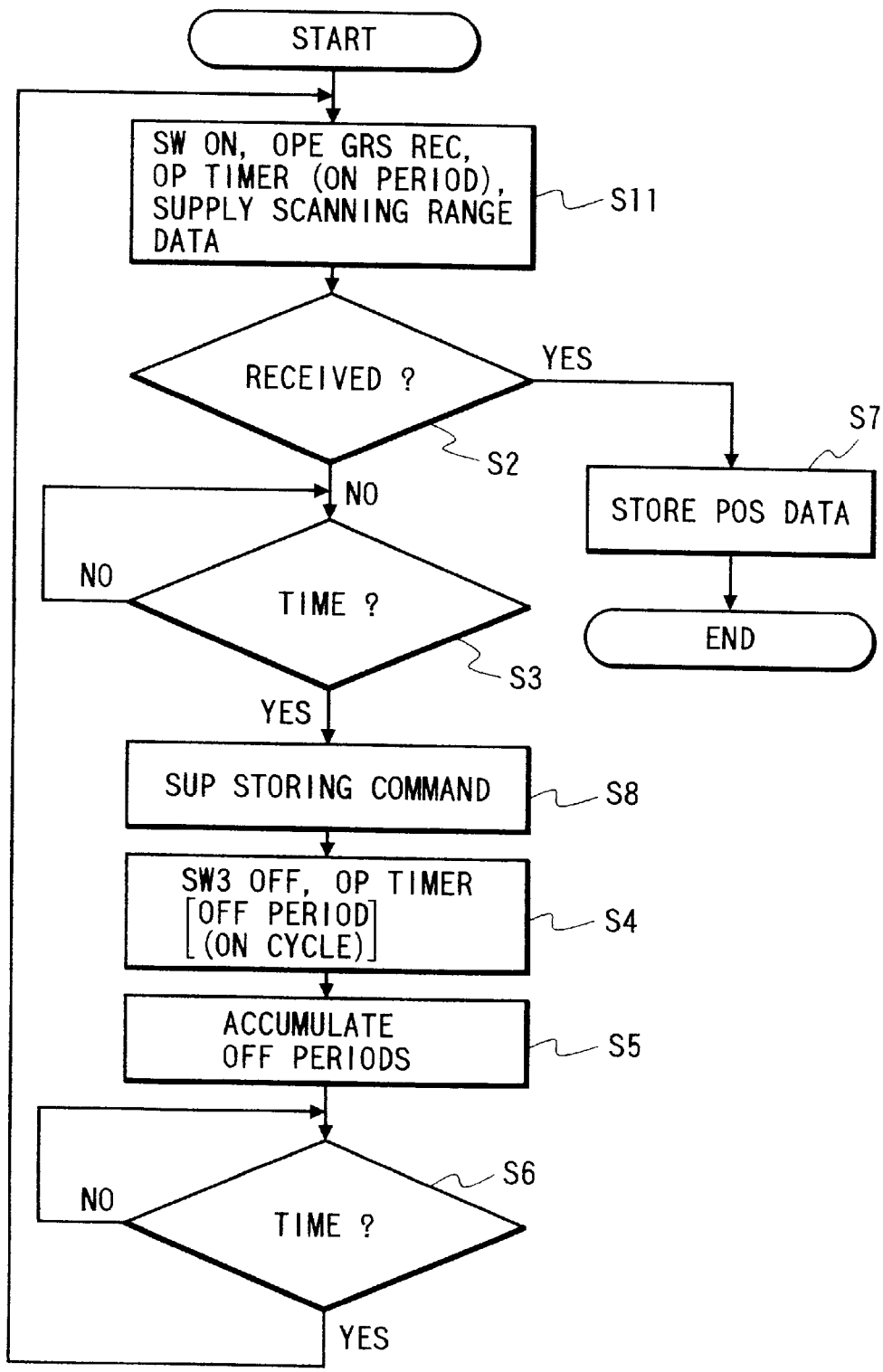
FIG. 8 depicts a flow chart of a modification.

A modification will be described. FIG. 8 depicts a flow chart of the modification. The structure of the modification is substantially the same as that of the first embodiment. The difference is that the microprocessor 5 operates in accordance with a program represented by FIG. 8 instead FIG. 3. In the position detection apparatus according to the modification, the microprocessor 5 operates the switch 3 to supply the power PWR1 to the GPS receiver using the switch 3 in step s11, detects whether the position data is outputted by the GPS receiver 2 for a predetermined interval from when the power is supplied using the timer 6 in step s3. The microprocessor 5 effects an intermittent receiving operation using the timer 6 and the switch 3 when the position data is not outputted by the GPS receiver for the predetermined interval through steps s8, s4, s5, s6, s11, s2, and s3 until the GPS receiver 2 outputs the position data and the microprocessor 5 stores the position data in step s7. The stored position data reads and outputs the latest position data from the memory in response to a position data requesting signal in step s41 as shown in FIG. 4.

What is claimed is:

1. A position detection apparatus comprising:
    a GPS receiver, including an antenna, for receiving at least a GPS radio wave signal, calculating and outputting position data from at least said GPS signal received;
    a power supply for supplying a power to said GPS receiver;
    a switch for controlling supplying said power to said GPS receiver;
    a timer; and
    control means for operating said switch to supply said power to said GPS receiver periodically using said timer and said switch, for detecting whether said position data is outputted by said GPS receiver for a predetermined interval from when said power is supplied using said timer, and for operating said switch to stop supplying said power to said GPS receiver when said position data is not outputted by said GPS receiver for said predetermined interval at the latest.

2. A position detection apparatus as claimed in claim 1, wherein said control means stop supplying said power immediately when said position data is outputted by said GPS receiver.

3. A position detection apparatus as claimed in claim 1, wherein said control means comprises a memory for storing said position data from said GPS receiver and said control means reads and outputs the latest position data from said memory in response to a position data requesting signal.

4. A position detection apparatus as claimed in claim 1, wherein said GPS signal includes a first PRN code and said control means generates a storing command just before said control means stops supplying said power, calculates a total period while said power is continuously not supplied to said GPS receiver, and supplies data of said total period to said GPS receiver when said control means supplies said power to said GPS receiver, and wherein said GPS receiver comprises:
    a PRN code generator for generating a second PRN code with a phase of said second PRN code controlled in accordance with phase control data;
    storing means for storing said phase control data in response to said storing command;
    range data generation means for generating scanning range data in accordance with said data of said total period;
    correlation detection means for detecting a correlation between said first and second PRN codes; and
    phase control means for generating and supplying said phase control data to said PRN code generator and said storing means in accordance with a correlation result from said correlation detection means and for scanning said first PRN code with said second PRN code with said phase control data successively changed in accordance with said correlation result from said correlation detection means with a range determined by said scanning range data and said stored phase data when said power is supplied to said GPS receiver.

5. A position detection apparatus as claimed in claim 1, wherein said control means further comprises receiving means for receiving an ON period data and operates said switch to supply power to said GPS receiver at a cycle determined in accordance with said ON period data using said timer.

6. A position detection apparatus comprising:
    a GPS receiver for receiving a plurality of GPS signals and for calculating and outputting position data from said received plurality of GPS signals when more than a predetermined number of GPS signals are received;
    a power supply for supplying a power to said GPS receiver;

a switch for controlling supplying said power to said GPS receiver;

a timer; and control means for operating said switch to supply said power to said GPS receiver using said switch, for detecting whether said position data is outputted by said GPS receiver for a predetermined interval from when said power is supplied using said timer, and for effecting an intermittent receiving operation using said timer and said switch when said position data is not outputted by said GPS receiver for said predetermined interval until said GPS receiver outputs said position data.

7. A position detection apparatus as claimed in claim 6, wherein said control means comprises a memory for storing said position data from said GPS receiver and said control means reads and outputs the latest position data from said memory in response to a position data requesting signal.

* * * * *